(12) United States Patent
Willenborg

(10) Patent No.: US 6,477,610 B1
(45) Date of Patent: Nov. 5, 2002

(54) REORDERING RESPONSES ON A DATA BUS BASED ON SIZE OF RESPONSE

(75) Inventor: Scott Michael Willenborg, Stewartville, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/499,059

(22) Filed: Feb. 4, 2000

(51) Int. Cl.[7] ............................................. G06F 13/36
(52) U.S. Cl. ........................ 710/310; 710/308; 710/313; 710/34
(58) Field of Search ................................ 710/305–315, 710/22–28, 33–35

(56) References Cited

U.S. PATENT DOCUMENTS

| | | | |
|---|---|---|---|
| 4,145,739 A | 3/1979 | Dunning et al. ............. 364/200 |
| 5,134,699 A | 7/1992 | Aria et al. .................... 395/425 |
| 5,179,663 A | 1/1993 | Iimura ......................... 395/250 |
| 5,247,671 A | * 9/1993 | Adkins et al. .............. 709/103 |
| 5,434,872 A | 7/1995 | Petersen et al. ............ 371/57.1 |
| 5,455,913 A | 10/1995 | Shrock et al. ............... 395/280 |
| 5,579,530 A | 11/1996 | Solomon et al. ............ 395/855 |
| 5,581,790 A | 12/1996 | Sefidvash .................... 395/854 |
| 5,613,162 A | 3/1997 | Kabenjian .................... 395/842 |
| 5,864,712 A | 1/1999 | Carmichael et al. ........ 395/840 |
| 5,881,248 A | * 3/1999 | Mergard ...................... 710/100 |
| 5,928,327 A | * 7/1999 | Wang et al. ................. 709/219 |

* cited by examiner

Primary Examiner—Sumati Lefkowitz
(74) Attorney, Agent, or Firm—Karuna Ojanen

(57) ABSTRACT

The efficiency of an overall computer communications system is greatly improved by a new method to transfer data on a data communications bus. The method allows one or more small command structures of a smaller size to have priority in bus arbitration; and then allow normal bus arbitration to permit large data transfers, such as DMA read operations. Thus, the method balances the need to keep I/O devices utilized, which devices would otherwise experience latency because they are waiting for the larger DMA read operations to conclude. But by allowing a configurable number of these smaller operations to proceed and then permitting larger data transfers to occur, both the host bus and the I/O bus are efficiently utilized.

12 Claims, 4 Drawing Sheets

REORDERING RESPONSES ON A DATA BUS BASED ON SIZE OF RESPONSE

TECHNICAL FIELD

This invention relates generally to the field of computers and of transmitting commands to and from a computer memory on a bus, and more particularly, relates to giving priority to a threshold number of small commands and then allowing a large direct memory access command to be executed on the bus.

DESCRIPTION OF RELATED ART

The basic hardware structure of a computer is a processor and a memory inside the computer and a number of input/output (I/O) ports with which to communicate with the world outside the computer. The I/O ports are usually attached to at least one I/O adapter which communicates with other computers and devices. Computers use specific protocols for communications between its internal operating system programs and the I/O adapters to transfer information to various I/O devices such as external disk storage, communications, network capabilities, etc. The I/O protocols are specific command and response messages exchanged on an I/O bus interconnecting the computer's host processor and its memory called the host system to I/O adapters or I/O processors. An I/O processor can be considered a complex I/O adapter having more functions, usually in support of operating system programs and will be considered within the broader class of I/O adapters.

In I/O protocols, device driver programs in the computer's operating system create command messages that are transmitted across an I/O bus to the I/O adapter. The I/O adapter interprets the command and performs the requested operation. This operation may transfer data between an I/O device connected to the I/O adapter and the computer memory across the I/O bus. Typically, data are transferred using known direct memory access (DMA) mechanisms that are I/O bus functions. When the I/O adapter has completed the requested operation, it responds back to the computer memory. The operating system and device driver programs interpret that response and conclude the overall I/O operation.

An example of an I/O bus is the Peripheral Component Interconnect (PCI) bus architecture which includes a host system with a host processor complex and a main memory connected to a plurality of I/O adapters via a PCI bus. The conventional PCI bus is a 32-bit bus and operates at 33 MHz with a peak throughput of 132 megabytes per second. One way to think about the bandwidth is to imagine a 32-lane highway with a 33 mile per hour speed limit and the throughput as a measure of the total traffic or data passing through that highway in a given time period.

The PCI-X is an updated PCI I/O bus specification released in late 1999 that breaks the "one gigabyte per second" barrier in sustainable bandwidth for use in high-bandwidth applications such as Gigabit Ethernet, Fibre Channel, Ultra3 SCSI and high-performance graphics. PCI-X supports 32-bit and 64-bit operations at frequencies up to 133 MHz to allow the performance capability of over 1 Gbyte/sec data throughput. Carrying the highway analogy forward, the PCI-X bus can be considered a 64-lane highway with a speed limit of 133 mph, capable of carrying roughly ten times the traffic in a given time period compared with the conventional PCI bus.

The PCI-X bus specification, however, provides a number of challenges for bus designers. Unlike conventional PCI bus architecture which does not define or distinguish the specific communications about the content or type of information exchanged between a host system and an I/O adapter, all operations on a PCI-X bus have a length associated with them. Thus, typically for a PCI bus, it is very common to allow the data to flow into a buffer and when a threshold mark is reached, to start emptying the buffer to the other bus. While the same approach may work in PCI-X, it is grossly inefficient.

In the PCI/PCI-X specification, an I/O adapter typically includes a set of memory locations collectively be called a register set or a command buffer and a response buffer which are seen by the host processor as additional memory locations in its own memory space, i.e., the host system software "maps" these PCI/PCI-X I/O adapter memory locations into the totality of the host system memory regions that are accessible using processor memory load and store operations. Thus, the typical host processor performs memory store operations to PCI/PCI-X I/O adapter memory locations to transmit a command on the PCI/PCI-X bus to a common buffer and performs memory load operations from I/O adapter memory to retrieve a response of status information on the PCI/PCI-X bus from the I/O adapter. Unlike processor store or load operations directed to actual host system memory, processor store or load operations to PCI/PCI-X I/O adapter memory locations usually require more time and are considered very time-expensive with respect to the host processor.

In response to the command, the I/O adapter typically performs the requested operation and then generates a response message to inform the host system of the result and any errors that have occurred. This response message is typically stored in the I/O adapter's response message buffer and these response messages are typically small when compared to transferring large amounts of data across the I/O bus. The size of the response messages vary but typically they are less than 128 bytes and can be as small as four to eight bytes, depending upon the configuration of the operating system and memory. The host system then retrieves the response message and extracts protocol information from the retrieved response message to determine the I/O adapter's response to the command. More particularly, the PCI/PCI-X host system reads the response message from an address in a memory of the I/O adapter to retrieve the response message. One consequence of such a PCI/PCI-X system is that the host system processor experiences latency because it must store the command to the I/O adapter memory and then load response data from the I/O adapter memory.

The execution of I/O commands by an I/O adapter typically requires a time duration that is many thousands, or even millions, of host processor instruction cycles. Thus, while the I/O adapter is performing a command, the device driver and computer operating system normally perform other work and are not dedicated strictly to waiting for the I/O adapter to complete the command and forward the response message. Rather, the typical device driver and operating system rely upon an asynchronous event indication, such as a processor interrupt, to signal that the I/O adapter has completed the command and that the response message is available for the operating system and device driver to interpret.

The relative timing and frequency of the signals to interrupt the processor have significant effects on the overall utilization of the host processor, utilization of the I/O adapter and its data throughput capabilities, and overall system performance. Such utilization is also affected by I/O command latency, or the duration of an I/O operation as seen by the programs that depend upon that I/O operation to complete their functions. In a large high performance processor system, the latency for an I/O memory read across a conventional PCI/PCI-X bus may require many, many processor cycles which seriously degrades execution speed of a program depending upon that I/O memory read. More particularly, a high performance processor attempting to do a single memory read of a four-byte response from a PCI/PCI-X device may experience a latency to complete that memory read of several hundred or even several thousand processor cycles.

The PCI/PCI-X local bus specification utilizes a mechanism that potentially alleviates some of these inefficiencies resulting from I/O latencies. This mechanism sets target latencies which limit the time in which the master, i.e., host system, the bus arbitrator, and the target, i.e., I/O adapter, must wait for responses. In practice, the PCI/PCI-X bus has a minimum latency based on its cycle time which is currently on the order of up to 133 MHz, so there are still guaranteed minimum latencies of several microseconds. Furthermore, the maximum, target latencies that the PCI/PCI-X standard would expect are typically on the order of many to several hundred microseconds. Potentially, for a slow I/O adapter that maximum latency could even realistically be upwards of a millisecond or even several milliseconds. The consequence to a high performance processor running with, for example, a seven nanosecond cycle time, is that, even at minimum expected latencies on a PCI/PCI-X bus, the processor is facing several hundred to several thousand cycles of time delay.

To optimize host processor utilization, conventional systems typically attempt to minimize the number of processor instruction cycles required to recognize the completion event and communicate this event to the I/O adapter device driver. To optimize I/O adapter throughput, conventional systems also attempt to minimize the time between the completion of one I/O command and the start of the next I/O command. To optimize overall system performance, in relation to programs that require I/O, conventional systems minimize the latency of an I/O operation, measured from the time the command is created until the time the response has been interpreted and the results are available to the program that caused or required the I/O, such as, for example, an "OPEN FILE" function that requires a disk read operation to get information about the location of the requested file.

To accomplish these objectives, conventional I/O protocols also employ both command and response queues located in the computer main memory, I/0 adapter memory or registers, or a combination of both. Command queues enable the device driver to create new commands while the I/O adapter executes one such command. Response queues enable the I/O adapter to signal the completion of previous commands and proceed to new commands without waiting for the device driver or operating system to recognize and interpret the completion of these previous commands.

Similarly, computer systems generally include a processor interrupt mechanism which the I/O adapter uses to signal completion of a command and notify the host processor that a response message has been placed on the response queue. The interrupt mechanism provides a signal line from the I/O adapter to the processor that, when asserted, asynchronously interrupts the host processor and switches processor execution from its current program to an operating system or device driver program designed to interpret the interrupt event. While this interrupt mechanism can help optimize the latency associated with the completion of an I/O command and interpretation of the response message, switching the host processor execution from its current program to an interrupt program requires a processor context switch that requires many instruction cycles.

A context switch saves the current program's critical information such as selected processor registers and state information and loads the interrupt program's critical information. When the interrupt program completes its immediate work and is ready for the processor to resume the interrupted program, there is a second context switch to restore the critical information of the interrupted program which allows the processor to resume the interrupted program. Each context switch consumes valuable processor time. Because conventional systems interrupt the processor every time an I/O event has completed, context switches are relatively frequent and result in processor inefficiency.

Most host system PCI/PCI-X buses seek to increase the physical connections and possible I/O devices to the PCI/PCI-X bus to insure higher utilization of the PCI/PCI-X bus while minimizing the cost of these connections but it is impractical to provide many interrupt signals from every connection on the PCI/PCI-X bus. Thus, in practice many host systems limit the number of PCI/PCI-X bus connections which can either provide more than one interrupt signal or in which all or some subset of interrupt signals are connected to a single interrupt signal to the host system. Still, multifunction I/O adapters require increased host processor expense to interrogate individual I/O adapter functions to determine the source(s) of a PCI/PCI-X interrupt from the physical connection.

Memory write operations to retrieve data from an I/O adapter or PCI/PCI-X bus hardware require many host processor cycles to retrieve the data because the host processor waits for the loading operation to complete. Memory read operations which read commands from the host processor to I/O adapters and PCI/PCI-X bus hardware are not initially expensive in terms of host processor cycles, but the read command may not complete immediately and must either be verified via a write operation from the same PCI/PCI-X memory location or a series of processor write operations to verify the hardware between the central system processor and the I/O adapter. Memory read operations that require verification are commonly referred to as "verified" read operations. Memory read operations that do not require verification and that may be re-issued without adverse system effects are referred to as "non-verified" read operations. Thus, to optimize the overall system performance and minimize processor utilization, it is necessary to balance expensive write operations from I/O adapters and also expensive "verified" read operations to I/O adapters.

Thus, the problem of any bus management scheme is how to manage the conflicting goals of maximum bandwidth, fairness of arbitration, and latency of data returns. Allowing data to be returned in the order it is received, while "fair" can penalize small data transfers with large latencies as the small transfer can get "stuck" behind a number of large, e.g., four kilobyte transfers. If the four kilobyte transfers finish before allowing the small operations to proceed, which is "fair", the small operations wait a long time. Given that many small operations tend to be control type operations, e.g., fetching the next task to perform, and that latency which occurs while waiting on large transfers impacts how soon the I/O adapter can starts its next task, such an arbitration scheme, albeit "fair", unnecessarily risks idling an I/O adapter. On the other hand, if a small operation is allowed to be presented to the bus as soon as available larger operations would be continually preempted resulting in poor bus utilization as large operations more efficiently utilize the bus.

The PCI-X specification requires a host bridge to split complete reads to system memory that will not be met within the initial latency time, i.e., the requested data is not immediately available in the I/O adapter and so while the data is being returned, the PCI-X bus will fulfill other responses. This requirement turns a host bridge into a completor, or master, in order to initiate a transaction to the PCI-X device upon receiving the data from the host system memory. This differs significantly from earlier PCI specifications where the host bridge would simply wait for the device to repeat its request and terminate the transaction by deserting FRAME/ IRDY when its internal byte count has been satisfied. The problem for a host bridge in returning read data to the devices occurs when multiple devices exist under the host bridge. If a subset of the devices generate primarily short read requests while the remaining devices generate large read requests, bandwidth or latency are impacted.

If a host bridge simply returns the read request in the order received off the bus, devices doing short transfers, which tend to be timing critical, could suffer extremely long latency delays as there could be multiple read operations of four kilobytes or more reads in the FIFO ahead of the short read response. Alternatively, if latency is given priority and data is always returned as soon as it is received to minimize the latency, bandwidth on the bus will suffer as short data transfers are not as efficient as long data transfers.

SUMMARY OF THE INVENTION

The balance between maximizing the efficiency of a bus by allowing large data throughput and maximizing the efficiency of I/O devices waiting for a response or data from a host processor can be achieved by a method of selecting a data response to a command on a data transfer bus, with the method comprising the steps of simply selecting a data response to one of a plurality of commands, the selected data response waiting for the bus and being less than or equal to a threshold size; and then executing the selected data response on the bus. In a further embodiment, a number N of selected data responses may be allowed to accumulate and then the method will execute all of N selected data responses on the bus before executing other of data responses greater than the threshold size under normal arbitration on the bus. The bus may be a PCI/PCI-X bus. The maximum threshold size of the selected response may be what can be transferred in less than on the order of tens of bus cycles. In any event, the maximum threshold size is configurable to adapt to the bus speeds and processor speeds and particular applications; just as the number N of the selected data responses to be transferred is configurable.

The invention may further be realized by a method of selecting a data response to a command on a data transfer bus, comprising: selecting a data response to one of a plurality of commands, the selected data response waiting for the bus and being less than or equal to a programmable threshold size; allowing N number of selected data responses to accumulate; executing all of N selected data responses on the bus; and then executing other of the data responses greater than the threshold size under normal arbitration on the bus.

Objects and advantages of the invention may also be realized by an apparatus for transferring data, comprising: a host computer processor connected to a host memory on a host system bus; a host bridge connected to the host system bus, in which the host bridge comprises command queues to store commands, and buffers to store data associated with the commands, the data to be transferred according to the commands, and control logic to control the transfer of the data; and an I/O device connected to the host bridge on an I/O bus; wherein the data to be transferred either to/from the host computer processor from/to the I/O device is stored in the buffers and the control logic reviews the size of the data to be transferred and selects those of the commands associated with data less than a threshold size for transfer of the data. The data may be transferred on the host system bus. Alternatively, the data may be transferred on the I/O bus. The I/O bus may be a PCI-X bus.

The invention may further be considered an apparatus for transferring data on a bus in an information handling system, comprising: means to store at least one command associated with the transfer of data; means to store the command and the data to be transferred; means to evaluate the size of the data to be transferred; means to give priority to at least one command in which the data to be transferred is less than a threshold size and to execute the prioritized command and transfer the data on the bus before executing any other command to transfer data having a size greater than the threshold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention.

DETAILED DESCRIPTION OF PREFERRED EMBODIMENT

Figure 1:
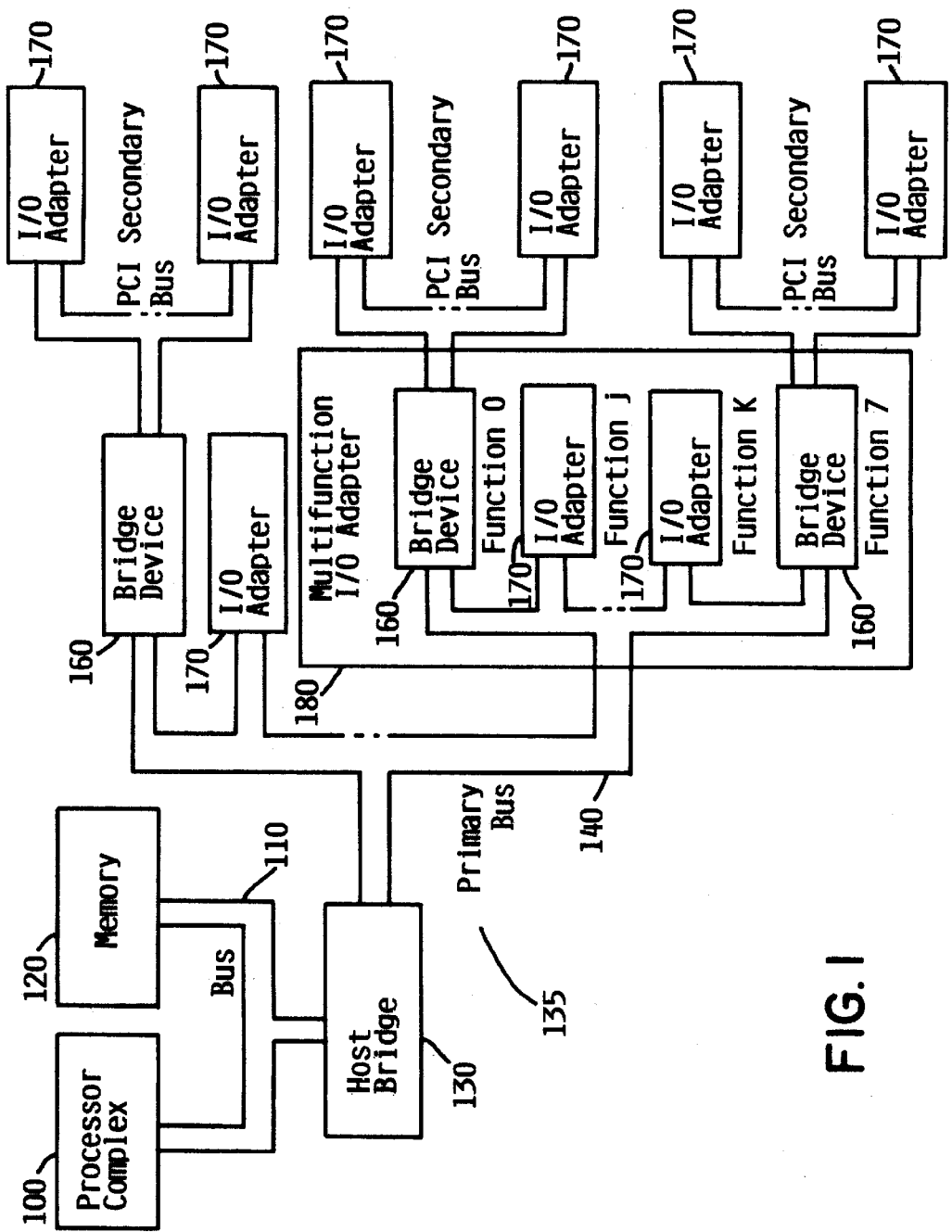
FIG. 1 is high-level block diagram illustrating an I/O interconnection topology according to the teachings of the present invention.

FIG. 1 illustrates the components and an interconnection topology for an information handling system, typically a computer system, utilizing the present invention. A host processor complex 100 and memory 120 are connected to host system bus 110. Host bridge 130 interconnects the host system bus 1 10 with a primary bus 140. Various components are connected to the primary bus 140 including, for example, I/O adapter 170, bridge device 160 and a multifunction I/O processor or a multifunction adapter 180. The bridge device 160 bridges the primary bus 140 and a secondary bus 150 to which various I/O adapters 170 may be connected. The host bridge 130 and primary bus 140 are collectively referred to as an I/O bus 135. The I/O adapters 170 encompass a wide variety of I/O adapters including tape drives, optical drives, printers, disk controllers, other bus adapters, workstations, T-Ring, Gigabyte Ethernet, Ethernet, Fibre Channel, Ultra3 SCSI, FDDI, ATM, wireless relays, Twinax, LAN connections, WAN connections, high performance graphics, etc.

Figure 2A:
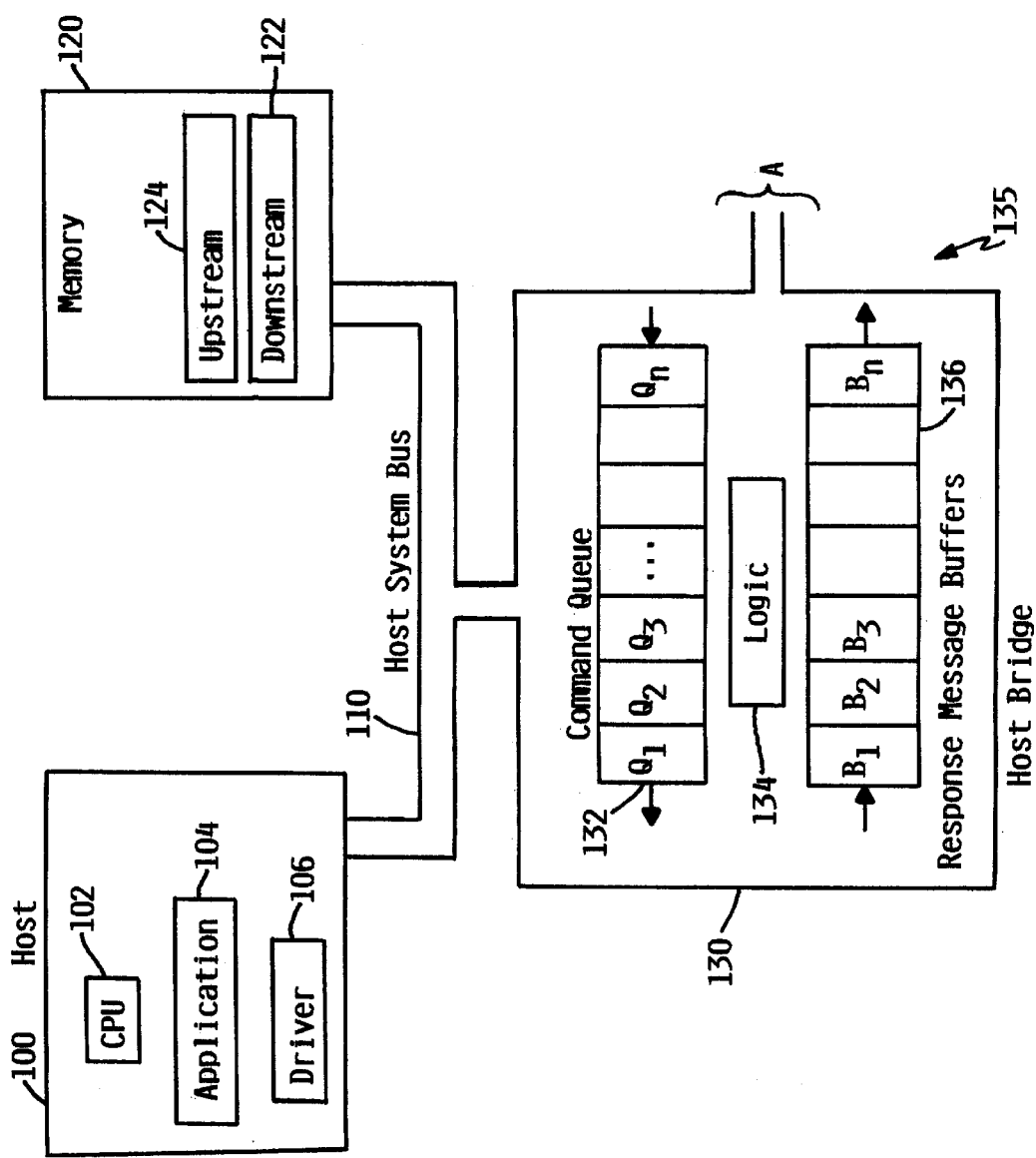
FIG. 2 is a high-level block diagram illustrating details of the interconnection topology including various registers and interrupt lines according to the teachings of the present invention.
Figure 2B:
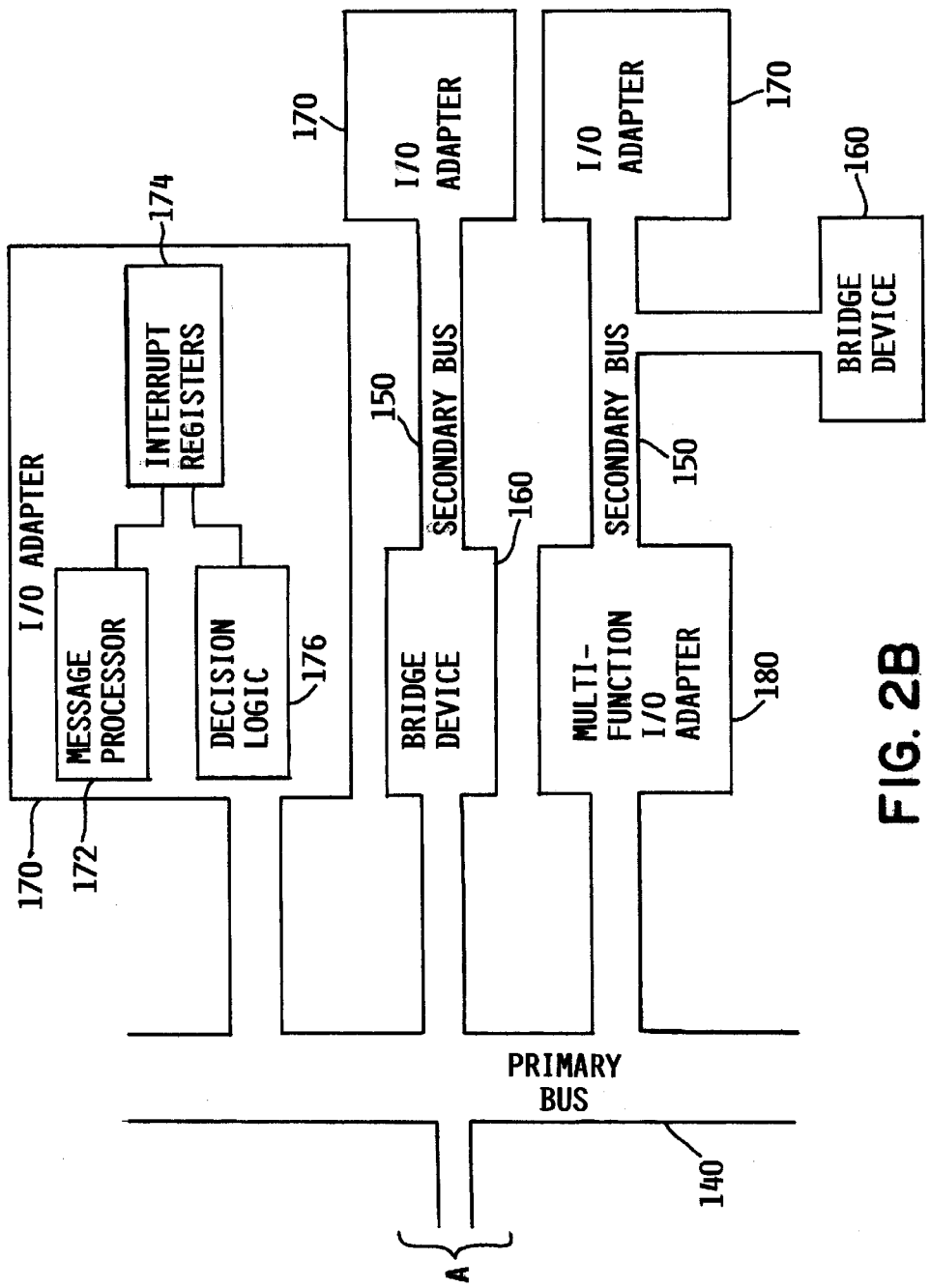

FIG. 2 shows more detail and function of the host processor complex 100, memory 120, host bridge device 130, I/O adapters 170, bridge devices 160, etc, The processor complex 100 includes a host processing unit (CPU) 102. Although only one CPU 102 is illustrated, it is to be understood that a multiple processors may be included within CPU 102. Furthermore, the memory 120 may be physically included within the processor complex 100 or connected to host system bus 110 as shown in FIG. 2. During I/O processing, the host processing unit 102 executes a device driver 106 program or function that permits the host processor complex 100 to communicate with the I/O adapter 170, bridge device 160, and/or a multifunction I/O adapter 180. When not processing I/O, the host processing unit 100 executes, for example, an application program 104. A conventional context switch procedure may be used to switch the context of the CPU 102 between the device driver 106 and the application program 104. Each bridge device 160 provides a bridge between the primary bus 140 and the secondary bus 150. The multifunction adapter 180 is another subset of I/O adapters which permit multiple I/O adapters 170 and/or bridge devices 160 to be connected to other I/O adapters 170 through a secondary bus 150.

In a preferred implementation, the primary bus 140, secondary bus 150, and I/O adapters 200 conform to the PCI/PCI-X bus specification. Also, the host bridge 130 in the preferred implementation is a PCI/PCI-X host bridge that bridges between and provides compatibility between the host system bus 110 and a primary bus 140. One skilled in the art realizes, however, that the implementation is not limited to a PCI/PCI-X bus implementation but may be applied to any bus where both small and large amounts of data must be transferred efficiently. A wireless bus implementation may also be included as part of the invention herein. Interrupt signals from I/O adapter 170, bridge device 160 and/or multifunction adapter 180 represents a subset of the I/O bus 135 and may be implemented with one or more PCI/PCI-X or other bus interrupt signals.

The memory 120 of the processor complex 100 further includes a downstream queue structure 122 storing downstream messages such as command messages from the host processor complex 100 to the I/O adapter 170. Memory 120 also stores an upstream queue structure 124 storing upstream messages such as a response message to the host processor complex 100. The terms "upstream" and "downstream" are relative terms taken from the host processor complex 100 point of view. As an alternative, it is to be understood that the point of view may be changed in an equivalent manner. For example, the roles of the processor complex 100 and I/O adapter 170 could be reversed such that the I/O adapter 170 is considered "upstream" with respect to the processor complex 100.

Apart from and in addition to conventional I/O adapter and related control components such as direct memory access components, an I/O adapter 170 may include a message processor 172 in communication with decision logic 176. The I/O adapter 170 is also provided with interrupt registers 174 connected to the message processor 172 and decision logic 176; the registers 174 may be used separately or in combination with message transport mechanism registers as explained in more detail in U.S. patent application Ser. No. 08/950,755 filed Oct. 15, 1997 entitled, "Interrupt and Message Batching Apparatus and Method," and Ser. No. 08/951,157 filed Oct. 15, 1997 entitled, "Interrupt Mechanism and Methods," and U.S. Pat. No. 5,983,292 issued Nov. 9, 1999 entitled, "Message Transport Mechanisms and Methods;" all of which are commonly owned by the assignee herein and all of which are hereby incorporated by reference in their entireties. The message processor 172 processes incoming downstream messages from the processor complex 100. Message processor 172 also generates response messages and transmits response messages to the upstream queue 122. Decision logic 176 decides when to interrupt the processor complex 100 that work is pending on the upstream queue 124 by sending an interrupt signal.

Host bridge 130 comprises a command queue 132 in which to store commands from I/O adapters 170 attached to the primary bus 140 and any secondary bus 150. Commands, such as DMA reads or writes, are transmitted over the I/O bus 135 and are placed in a queue location $Q_n$ of command queue 132. Command queue 132 may or may not be a FIFO queue; but is capable of storing commands which must be retrieved according to some arbitration or control logic 134. Host bridge 130 also has a plurality of response message buffers 136 which hold data that the processor complex 100 returns upon execution of a DMA read command. Upon execution, a DMA read or any other command is taken from the command queue 132 and sent on the host system bus 110 or the I/O bus 140, as appropriate. Some time later, data is returned to the host bridge 130 and stored in the response message buffer 136, which may have been previously reserved for the returning data. The outgoing bus, however, may be busy because, e.g., another command is coming into the host bridge 130, two or more adapters are sending commands to each other on the primary bus 135 but not through the host bridge 130, multiple data replies could be coming into available buffers 136. In any event, upon completion of an action set forth in the command, the host bridge returns a response to the device or the processor initiating the command to complete execution of the command. With so many commands, the control logic 134 of the host bridge 130 must decide which command to send first.

Figure 3:
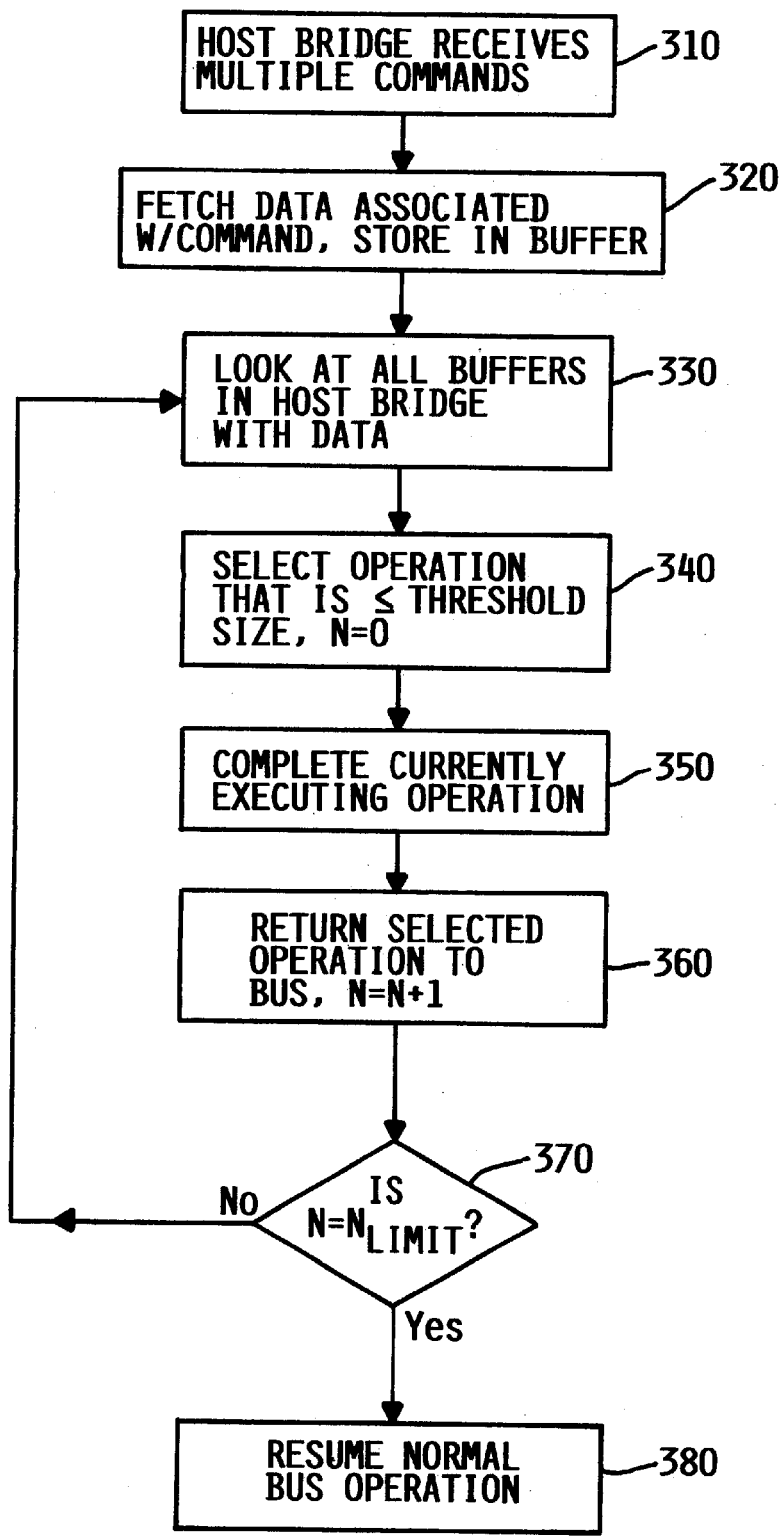
FIG. 3 is a high-level flow chart of the process to select commands and transmit data according to a preferred embodiment of the invention.

According to the preferred embodiment of the invention, control logic 134 simply scans all of the response message buffers 136 for small operations and sends a number of small operations first to minimize latency. The process by which the invention accomplishes its preferred method is set forth in the simplified flow chart of FIG. 3. In step 310, the host bridge has received a plurality of commands, some with data. In step 320, the processor or the I/O adapter will fetch the data that may be associated with a command and place the data in a response message buffer. Upon receipt of a command, in step 330, control logic 134 in the host bridge 130 looks at all the response message buffers 136 with data. In step 340, the operations that have data less than a threshold size, e.g., 128 bytes, are selected for transport on the appropriate bus, either host system bus 110 or I/O bus 135. The invention realizes that because the length is known at the start of the operation, significant performance benefits can be obtained to maximize PCI/PCI-X bus bandwidth. With other bus structures, the size of the data transfer may be ascertained by subtracting the starting address of the data in memory or in the response message buffers from the ending address; sometimes the size of the data transfer is set forth in the initial data string. Determining the size of the data to be transferred can be done by conventional means as is known. In step 350, the currently executing operation is completed although it could be interrupted given an arbitration scheme of priority. In step 360, a number of selected operations of a size smaller than the threshold size are returned to the I/O bus 135 and the number of such operations transferred on the bus is counted in some fashion, e.g., by incrementing N in a counter. In step 370, an inquiry is made to determine how many small selected operations have been executed on the bus. If some limit of small selected operations have been executed or if there are no more small operations to execute on the I/O bus 135, then in step 380, the bus may return to normal bus operations including executing large, on the order of four kilobytes or more, DMA read/write commands. Normal bus operations are known in the art and include such arbitration such as first in time, higher in priority, round robin, etc.

The invention reduces latency of timing critical transactions, such as the smaller control transactions, while maximizing bandwidth by bursting long transfers, such as the larger DMA read/write commands. When DMA reads are received on the I/O bus 135, the host bridge 130 fetches the data from system memory 120 and buffers it internally in buffers 136. Rather than return the data as soon as it is received and impacting bandwidth, the data is buffered until a byte count for large DMA read/write commands is satisfied. The host bridge 130 may use any of several arbitration schemes but which should grant priority to a threshold number of short responses less than a threshold size. If a short response has all of its data, it is sent to the bus ahead of long responses, regardless of the order the read requests were received from the devices. This minimizes latency of short latency sensitive DMA reads. If no short responses exist, a long response is sent to the I/O bus. After completing the long response, however, short responses revert to top priority. A programmable counter is provided to prevent a constant stream of short responses from completely blocking out long responses.

Unlike multi-channel priority schemes connected to, e.g., a multitasking I/O adapter which has multiple DMA channels, each capable of performing an independent task, the invention as described herein is a multirequest system. Any incoming request up to the size of the buffer and not necessarily associated with any channel is buffered and the command executed. The prioritization scheme for returning data is length. For instance, given a number of disk controllers which normally read/write pages of four kilobytes to/from memory. A prior art system will typically move these large blocks of data and send large burst DMAs to efficiently utilize the bus. When fetching a control block, however, the size of the data transferred is much smaller, e.g., on the order of four to thirty-two bytes indicating the next task to perform. In this example, prioritizing the disk controller as a "low priority" device, as in the prior art, would adversely affect performance because while the other disk controllers are utilizing the bus to stream out the pages of four kilobytes each, the control block fetch for the idle device would be waiting for the large data transfer to complete. Prioritization by channel/device does not accommodate the occasional small fetch. This invention, on the other hand, prioritizes fetches based on size, allowing both high bandwidth and low latency for small operations.

In the foregoing specification, the invention has been described with reference to specific exemplary embodiments thereof. It will, however, be evident that various modifications and changes may be made thereto without departing from the broader spirit and scope of the invention as set forth in the independent claims. For example, it is intended that the size of the small operations which are given priority be configurable according the processor and bus bandwidth, the size of memory, the use of computers. A computer dedicated to handling a majority of small transactions may give smaller operations higher priority frequency or, under other circumstances, may give a large DMA read priority. It is also contemplated that the number of small transactions that accumulate before these transactions are given priority on the bus be programmable. For instance, in some circumstances a vital I/O device may initiate an interrupt and only one small command structure will be given priority, whereas in other circumstances, for instance, when the I/O devices are not so critical, that a number of small operations may accumulate before these operations are given priority over a more efficient larger DMA read operation. Similarly, the demarcation between what is a small operation and what is a large operation is relative and is intended to be configurable, given a specific hardware configuration and particular software applications. For instance, computers connected to many I/O devices or receiving data from or transferring data to these devices for business or communications applications, e.g., network computers, etc. will be configured differently than a main frame computer with scientific applications. In the instance given, large operations were assumed to be disk operations, paging or tape operations in which data of one or more kilobytes was being transferred requiring hundreds or thousands of processor and/or bus cycles. Smaller control operations on the order of tens or hundreds of bytes may require processor and/or bus cycles on the order of tens of cycles. Thus, the invention is not intended to be limited to any size of a particular command or any specific frequency of a bus. The specification and drawings are accordingly to be regarded as illustrative, rather than restrictive and the invention is further defined by the following claims.

What is claimed is:

1. A method of selecting a data response from a plurality of buffered responses to a plurality of commands, the responses for transfer on a data transfer bus, comprising:
    (a) selecting a data response, said selected data response waiting for the bus and being less than or equal to a maximum threshold size; and
    (b) transferring the selected data response on the bus.

2. The method of claim 1, further comprising:
    (a) allowing N number of selected data responses to accumulate;
    (b) transferring all of N selected data responses on the bus; and
    (c) transferring other of said data responses greater than said maximum threshold size under normal arbitration on the bus.

3. The method of claim 2, wherein said bus is a PCI/PCI-X bus.

4. The method of claim 2, wherein said maximum threshold size is on the order of tens to twenty bus cycles.

5. The method of claim 1, wherein said maximum threshold size is configurable to adapt to speeds of said data transfer bus.

6. The method of claim 1, wherein N is configurable.

7. A method of selecting a data response from a plurality of buffered responses to a plurality of commands, the responses for transfer on a data transfer bus, comprising:
    (a) selecting a data response, said selected data response waiting for the bus and being less than or equal to a programmable threshold size;
    (b) allowing N number of selected data responses to accumulate;
    (c) transferring all of N selected data responses on the bus; and
    (d) then executing other of said data responses greater than said threshold size under normal arbitration on the bus.

8. An apparatus for transferring data, comprising:
(a) a host computer processor connected to a host memory on a host system bus;
(b) a host bridge connected to said host system bus, said host bridge comprising command queues to store commands, and buffers to store data responsive to said commands, said responsive data to be transferred according to said commands, and control logic to control the transfer of said responsive data; and
(c) an I/O device connected to said host bridge on an I/O bus;

wherein said responsive data to be transferred either to/from said host computer processor from/to said I/O device is stored in said buffers and said control logic reviews the size of said responsive data to be transferred and selects those of said responsive data less than a threshold size for transfer.

9. The apparatus of claim 8, wherein said responsive data is transferred on said host system bus.

10. The apparatus of claim 8, wherein said responsive data is transferred on said I/O bus.

11. The apparatus of claim 10, wherein said I/O bus is a PCI-X bus.

12. An apparatus for transferring data on a bus in an information handling system, comprising:
(a) means to store a plurality of commands;
(b) means to store a plurality of responses to said plurality of commands;
(c) means to evaluate the size of said responses;
(d) means to give priority to and transfer on said bus those responses less than a threshold size before transferring responses having a size greater than said threshold.

* * * * *